United States Patent
Pujić et al.

(10) Patent No.: US 9,762,628 B2
(45) Date of Patent: Sep. 12, 2017

(54) IMPLEMENTATION OF THE SEMI-ATTENDED TRANSFER IN SIP FOR IP-MULTIMEDIA SUBSYSTEM ENVIRONMENTS

(71) Applicant: Avaya Inc., Basking Ridge, NJ (US)

(72) Inventors: Miloš Pujić, Belleville (CA); Joel M. Ezell, Broomfield, CO (US); Harsh V. Mendiratta, East Brunswick, NJ (US)

(73) Assignee: Avaya Inc., Basking Ridge, NJ (US)

( * ) Notice: Subject to any disclaimer, the term of this patent is extended or adjusted under 35 U.S.C. 154(b) by 330 days.

(21) Appl. No.: 13/770,551

(22) Filed: Feb. 19, 2013

(65) Prior Publication Data
US 2014/0233717 A1    Aug. 21, 2014

(51) Int. Cl.
| | |
|---|---|
| *H04L 12/66* | (2006.01) |
| *H04L 29/06* | (2006.01) |
| *H04M 3/58* | (2006.01) |
| *H04M 7/00* | (2006.01) |
| *H04M 3/42* | (2006.01) |

(52) U.S. Cl.
CPC .......... *H04L 65/1083* (2013.01); *H04M 3/58* (2013.01); *H04M 7/006* (2013.01); *H04M 3/42017* (2013.01)

(58) Field of Classification Search
CPC ..... H04L 65/1083; H04M 7/006; H04M 3/58; H04M 3/42017
USPC .......................................................... 370/352
See application file for complete search history.

(56) References Cited

U.S. PATENT DOCUMENTS

| | | |
|---|---|---|
| 7,440,440 B1 | 10/2008 | Abichandani et al. |
| 7,797,006 B2 | 9/2010 | Sung et al. |
| 7,919,963 B2 | 4/2011 | Jackson |
| 8,165,280 B1 | 4/2012 | Robbins |
| 8,938,545 B2 | 1/2015 | Ezell et al. |
| 2001/0003194 A1 | 6/2001 | Shimura et al. |
| 2005/0250493 A1* | 11/2005 | Elkarat et al. ............. 455/432.1 |
| 2006/0222152 A1* | 10/2006 | Elias et al. ................ 379/88.13 |
| 2006/0245403 A1 | 11/2006 | Kumar |
| 2006/0294245 A1 | 12/2006 | Raguparan et al. |
| 2007/0189220 A1 | 8/2007 | Oberle et al. |
| 2007/0276907 A1 | 11/2007 | Maes |
| 2007/0276947 A1 | 11/2007 | Panattu et al. |
| 2007/0286372 A1* | 12/2007 | DeMent ............ H04M 3/42017 379/142.01 |

(Continued)

FOREIGN PATENT DOCUMENTS

| | | |
|---|---|---|
| EP | 2299646 | 3/2011 |
| WO | WO 2009/105476 | 8/2009 |

OTHER PUBLICATIONS

IETF, Network Working Group, RFC 5589, Session Initiation Protocol (SIP) Call Control—Transfer.

(Continued)

*Primary Examiner* — Gerald Smarth
(74) *Attorney, Agent, or Firm* — Sheridan Ross P.C.

(57) ABSTRACT

A communication system, method, and components are described. Specifically, a communication system having the ability to facilitate a semi-attended transfer in SIP for an IP-Multimedia Subsystem (IMS) environment is disclosed. The semi-attended transfer is possible even though one or more Back-to-Back User Agents are positioned between users engaged in the semi-attended transfer.

22 Claims, 5 Drawing Sheets

(56) References Cited

U.S. PATENT DOCUMENTS

| | | | |
|---|---|---|---|
| 2007/0291106 A1* | 12/2007 | Kenrick | H04M 3/42017 348/14.01 |
| 2008/0002820 A1* | 1/2008 | Shtiegman | H04L 29/06027 379/211.02 |
| 2008/0037447 A1 | 2/2008 | Garg et al. | |
| 2008/0118040 A1* | 5/2008 | Shi | H04L 65/1006 379/69 |
| 2008/0126541 A1 | 5/2008 | Rosenberg et al. | |
| 2008/0144615 A1 | 6/2008 | Casey | |
| 2008/0162705 A1* | 7/2008 | Cai | H04W 8/20 709/228 |
| 2008/0186954 A1 | 8/2008 | Kumarasamy et al. | |
| 2008/0212764 A1 | 9/2008 | Fukuta et al. | |
| 2008/0219265 A1 | 9/2008 | Fieremans et al. | |
| 2008/0310312 A1 | 12/2008 | Acharya et al. | |
| 2009/0031029 A1 | 1/2009 | Rice | |
| 2009/0210538 A1 | 8/2009 | Allen et al. | |
| 2009/0245265 A1 | 10/2009 | Takeshima et al. | |
| 2009/0259515 A1 | 10/2009 | Belimpasakis et al. | |
| 2009/0296694 A1* | 12/2009 | Kalyanpur | H04L 12/66 370/352 |
| 2009/0327516 A1 | 12/2009 | Amishima et al. | |
| 2010/0128718 A1 | 5/2010 | Shen et al. | |
| 2011/0066694 A1 | 3/2011 | Barrett et al. | |
| 2011/0142222 A1* | 6/2011 | Yang | H04M 3/42017 379/207.16 |
| 2012/0184291 A1 | 7/2012 | Tietsch et al. | |
| 2013/0177011 A1 | 7/2013 | Carter | |
| 2013/0235986 A1 | 9/2013 | Ibrahim | |

OTHER PUBLICATIONS

IETF, Network Working Group, RFC 3891, The Session Initiation Protocol (SIP) "Replaces" Header.
U.S. Appl. No. 14/084,842, filed Nov. 20, 2013, Boyle et al.
Boulton et al., "An Extension to the Session Initiation Protocol (SIP) for Endpoint Session View," Internet Engineering Task Force, Mar. 26, 2009, 24 pages.
Worley, "Interoperation of "Application Server" B2BUAs with SIP Call Control," Internet Engineering Task Force, Jan. 23, 2010, 16 pages.
Extended European Search Report for European Patent Application No. 12186047.2 dated Apr. 24, 2013, 10 pages.
Official Action with English Translation for Korea Patent Application No. 2012-0108357, mailed Jan. 20, 2014, 7 pages.
Notice of Allowance with English Translation for Korea Patent Application No. 2012-0108357, mailed Jul. 24, 2014 3 pages.
Official Action for U.S. Appl. No. 13/485,604, mailed Sep. 4, 2014, 7 pages.
Official Action for U.S. Appl. No. 13/485,604, mailed May 22, 2014, 9 pages.
Official Action for U.S. Appl. No. 14/084,842, mailed Jul. 9, 2015 9 pages.
"3rd Generation Partnership Project; Technical Specification Group Core Network and Terminals; Inter-IMS Network to Network Interface (NNI) (Release 10)," 3GPP Standard: 3GPP TS 29.165, 3RD Generation Partnership Project (3GPP), Mobile Competence Centre, 650, Route Des Lucioles; 5-06921 Sophia-Antipolis Cedex; France, No. V10.2.0, Jan. 7, 2011.
Oberle et al. "Enhanced Methods for SIP based Session Mobility in a Converged Network," 16th IST Mobile and Wireless Communications Summit, 2007 IEEE Piscataway, NJ, USA, Jul. 1, 2007.
Extended Search Report for European Patent Application No. 14193676.5, dated Mar. 25, 2015 9 pages.
Official Action for U.S. Appl. No. 14/084,842, mailed Apr. 30, 2015 7 pages.

* cited by examiner

IMPLEMENTATION OF THE SEMI-ATTENDED TRANSFER IN SIP FOR IP-MULTIMEDIA SUBSYSTEM ENVIRONMENTS

FIELD OF THE DISCLOSURE

The present disclosure is generally directed toward communications and more specifically toward semi-attended transfers.

BACKGROUND

There are two typical call transfer use-cases: (a) an attended transfer (also known as consultative transfer) and (b) semi-attended transfer (also known as blind transfer).

Attended transfer satisfies the following telephony use-case. User A (the Transferor to be) and User B (the Transferee to be) are in an established session. User A decides to transfer User B to User C (the Transfer Target). User A initiates the transfer (e.g. by pressing the "transfer key" a first time), which causes User A to put User B on hold. Then, User A makes a call to User C. User A waits for User C to answer and announces to User C the pending call transfer. User A completes the transfer (e.g. by pressing the "transfer key" a second time). In this transfer scenario, User A expects to be out of both calls—the "original" call between User A and User B as well as the "consultation" call between User A and User C immediately following the transfer completion (e.g., after pressing the "transfer key" a second time). It is also expected that User B gets connected to User C.

Semi-attended transfers satisfy a similar yet slightly different telephony use-case. Specifically, User A (the Transferor to be) and User B (the Transferee to be) are in an established session. User A decides to transfer User B to User C (the Transfer Target). User A initiates the transfer (e.g. by pressing the "transfer key" a first time). User A puts User B on hold. Then, User A makes a call to User C. User A waits to hear ringback (or any other early media) from User C to make sure that he/she has dialed the correct address of User C. User A completes the transfer (e.g. by pressing the "transfer key" a second time) before User C has answered the call. In other words, the transfer is completed by User A before User C answers the call. User A expects to be out of both calls—the "original" call between User A and User B as well as the "consultation" call between User A and User C immediately following the transfer completion (e.g., after pressing the "transfer key" a second time). It is also expected that User B hears ringback (or early media) from User C and that User B gets connected to User C as soon as User C answers the call.

While implementation of the attended transfer is well covered by the industry standards (e.g., IETF RFC 5589, the entire contents of which are hereby incorporated herein by reference) and, thus, well understood and adopted in the industry with good inter-vendor interoperability, the situation is quite different with semi-attended transfer.

Semi-attended transfer has stumped the industry for years, primarily because the procedures of the attended call transfer cannot be followed for the semi-attended transfer. In fact, IETF RFC 3891, the entire contents of which are hereby incorporated herein by reference, explicitly disallows replacing an early dialog on the User Agent Server (UAS) side. Specifically, IETF RFC 3891 provides, "If the Replaces header field matches an early dialog that was not initiated by this UA, it returns a 481 (Call/Transaction Does Not Exist) response to the new INVITE, and leaves the matched dialog unchanged."

The primary reason that RFC 3891 disallows using INVITE with Replaces for replacement of an early dialog on the UAS side is that this does not work well in the presence of call forking to several endpoints.

As a result, an attempt to use the attended transfer procedures in the case of the semi-attended transfer results in a call failure in a standards-compliant SIP implementation. Many vendors ignore this aspect of the standard while others comply to the standard. The result is interoperability problems in solutions with mixed vendor SIP implementations.

Some vendors ignore the limitations of the Replaces mechanism imposed by RFC 3891 and apply the mechanism (e.g., the same one used by the attended transfer) to the semi-attended transfer. This yields a simple implementation that works in environments where forking is disabled (e.g., where only a single SIP endpoint is allowed to be registered against an address-of-record (AoR) at any point in time). Since this approach is not universally adopted, the solution has inherent interoperability problems in scenarios where the transferor and the transfer target use SIP endpoints from different vendors.

Other vendors have opted for the approach where the consultation call gets cancelled by the transferor and the transferee is instructed by the transferor to make a new call to the transfer target. This suffers from the following problems: (a) the transfer target may notice an unusual "stutter" in the alerting signal (because of the consultation call being cancelled and new call being presented to the transfer target) and (b) an inherent race condition exists between the transfer target answering the call and the transferor cancelling it which may result in a transfer failure.

SUMMARY

It is with respect to the above issues and other problems that the embodiments presented herein were contemplated. In particular, embodiments of the present disclosure propose the ability to facilitate a semi-attended transfer that overcomes the above-noted shortcomings. In some embodiments, a semi-attended transfer is facilitated by one or more of: (a) Intercepting the INVITE-Replaces; (b) Facilitating early media or 180 ringback to a transferee; (c) Dealing with forking during alert; and (d) Completing transfer after answer by sending a REFER message.

The approach described herein is unique in terms of recognizing that in environments similar, but not identical, to an IP Multimedia Subsystem (IMS) environment, the challenging part of the semi-attended transfer implementation can be relegated to a network entity instead of implementing them on the SIP endpoints and doing so (a) without obscuring the operation from the network applications, (b) with full support for early media, (c) with full support for parallel forking/multiple endpoint registrations, (d) with good interoperability, and (e) allowing active-active redundancy/dynamic load sharing among IMS application servers.

Embodiments of the present disclosure solve the semi-attended transfer problem for IMS environments typified by the following:

The transferor is an IMS user (e.g., the transferor is an "explicit" SIP user with: (a) a SIP endpoint and (b) an IMS Communication Profile which associates the user with a Primary Application Server (AS)

The transferor does not have to use an endpoint which complies with the proposed implementation (e.g., a "compliant" endpoint); use of a compliant SIP endpoint brings all the benefits of this solution; use of a "generic" SIP endpoint brings most of the benefits of this solution The transferee and the transfer target may be but do not have to be administered IMS users The transferee and transfer target may use SIP endpoints (compliant or generic) or non-SIP endpoints (e.g., as facilitated by a SIP-enabled PBX or a SIP trunk)

The transferor's Primary AS is a Back-to-Back User Agent (B2BUA) that is sequenced into every call received and/or made by the transferor Consequently, the transferor's Primary AS is sequenced into the consultation call as part of an origination application sequence There may be other application servers in the origination and/or termination application sequence of the transferor, transferee, and/or transfer target (they all should comply with the well-behaved B2BUA rules for sequenced applications)

In accordance with at least some embodiments of the present disclosure, the high-level approach can be summarized as taking advantage of the presence of the Primary AS acting as a B2BUA sequenced application on all calls of a transferor. One way to view embodiments disclosed herein is that the transferor's endpoint is implementing the "incorrect" usage of the replaces primitive (e.g., it instructs the transferee to replace an early dialog), but the transferor's Primary AS is making adjustments to enable that to work.

In some embodiments, the Primary AS of the transferor "fixes-up" the semi-attended transfer issues including, without limitation: (a) Intercepting the INVITE with Replaces sent from the transferee to the transfer target and (b) Holding on to the INVITE with Replaces until the transfer target answers the consultation call. In other words, the transferor's Primary AS implements a "Semi-Attended Transfer Helper" function for the transferor.

In some embodiments, if the transferor (e.g., User A) completes the transfer while the consultation call with the transfer target (e.g., User C) is ringing, the transferor behaves following the attended transfer logic. In this scenario, the transferor needs to populate the escaped Replaces header in the Refer-To header of the REFER request sent to the transferee (e.g., User B). If the consultation call has been forked, several early dialogs might be seen by the transferor. The transferor needs to decide which one to include in the Replaces header as well as whether to decorate the dialog with a new av-match parameter or not. It should be noted, however, that in most cases it does not matter which one is selected.

In some embodiments, the semi-attended transfer helper intercepts the INVITE w/Replaces. The semi-attended transfer helper then realizes that the dialog to be replaced is not yet answered. This triggers the "helper" handling whereby the transfer helper: (a) sends the 180 Ringing response to the transferee to facilitate a progress tone being provided to the transferee; (b) sends an UPDATE request to the transfer target on the consultation call dialog to let the transfer target and the downstream sequenced application(s) know that the dialog is being re-purposed (e.g., by a description in the message's Reason header) and that a new calling party is now attached to the ringing call (e.g., by information contained within the message's PAI/From header). After the transfer target answers, in some embodiments, the transfer helper sends a REFER request to the transferee on the intercepted call dialog to stop usage of the re-purposed dialog and replace it with a new one. This step also creates a proper topology of sequenced applications on the transferee—transfer target call. When the transferor receives a sipfrag notification that the referred call is ringing at the transfer target, the transferor optionally uses this notification as a trigger to terminate the original call with the transferee and the consultation call with the transfer target. It achieves the former by sending a BYE request on the original call; the latter by sending a CANCEL request on the consultation call.

Embodiments of the present disclosure also provide two extensions to the SIP protocol. The first of the two extensions includes an extension to the Replaces header to deal with forking environments. Specifically, the first extension provides a new parameter "av-match" with values "relaxed" and "strict." A fully specified dialog with the special av-match parameter specified as "relaxed" indicates that the transfer is to be completed successfully regardless of which early dialog ends up answered (e.g., call-id-xxx;from-tag=yyy;to-tag=zzz;av-match="relaxed"). On the other hand, a fully specified dialog with the special av-match parameter specified as "strict" indicates that the transfer is to be completed successfully if and only if the specified early dialog ends up answered. An example of such an extension might look like the following—call-id-xxx;from-tag=yyy;to-tag=zzz;av-match="strict"). In the first extension, in some embodiments, "relaxed" is the default value of the av-match parameter (e.g., an absence of the av-match parameter should be interpreted as if the av-match="relaxed" is present). Of course, an opposite logic could be followed without departing from the proposed invention.

A second of the two extensions includes an extension to the Reason header to notify downstream SIP application(s) about the transfer operation during the short time of dialog re-purposing. An example of such an extension might look like the following—Reason: avaya-action; cause=9; text="CompleteTransfer".

In accordance with at least some embodiments of the present disclosure, a method of facilitating a semi-attended transfer between a transferor, a transferee, and a transfer target is provided which generally comprises:

intercepting a first message transmitted from a transferee's endpoint to a transfer target's endpoint, the first message containing information to execute the transfer;

determining that a dialog between a transferor's endpoint and the transfer target's endpoint has not been answered prior to intercepting the first message; and invoking a transfer module to facilitate at least one of early media and ringback to be provided to the transferee's endpoint even though the transfer target has not answered a transfer call.

In further embodiments, the transfer module is further configured to hold the first message until a second message is received indicating that the transfer target has answered the transfer call at the transfer target's endpoint, receive the second message indicating that the transfer target has answered the transfer call at the transfer target's endpoint, and in response to determining that the transfer target has answered the transfer call, transmit a third message to the transferor's endpoint, the third message containing information to stop usage of a dialog that includes at least one device associated with the transferor and transition to a new dialog that excludes the transferor and the at least one device associated with the transferor.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
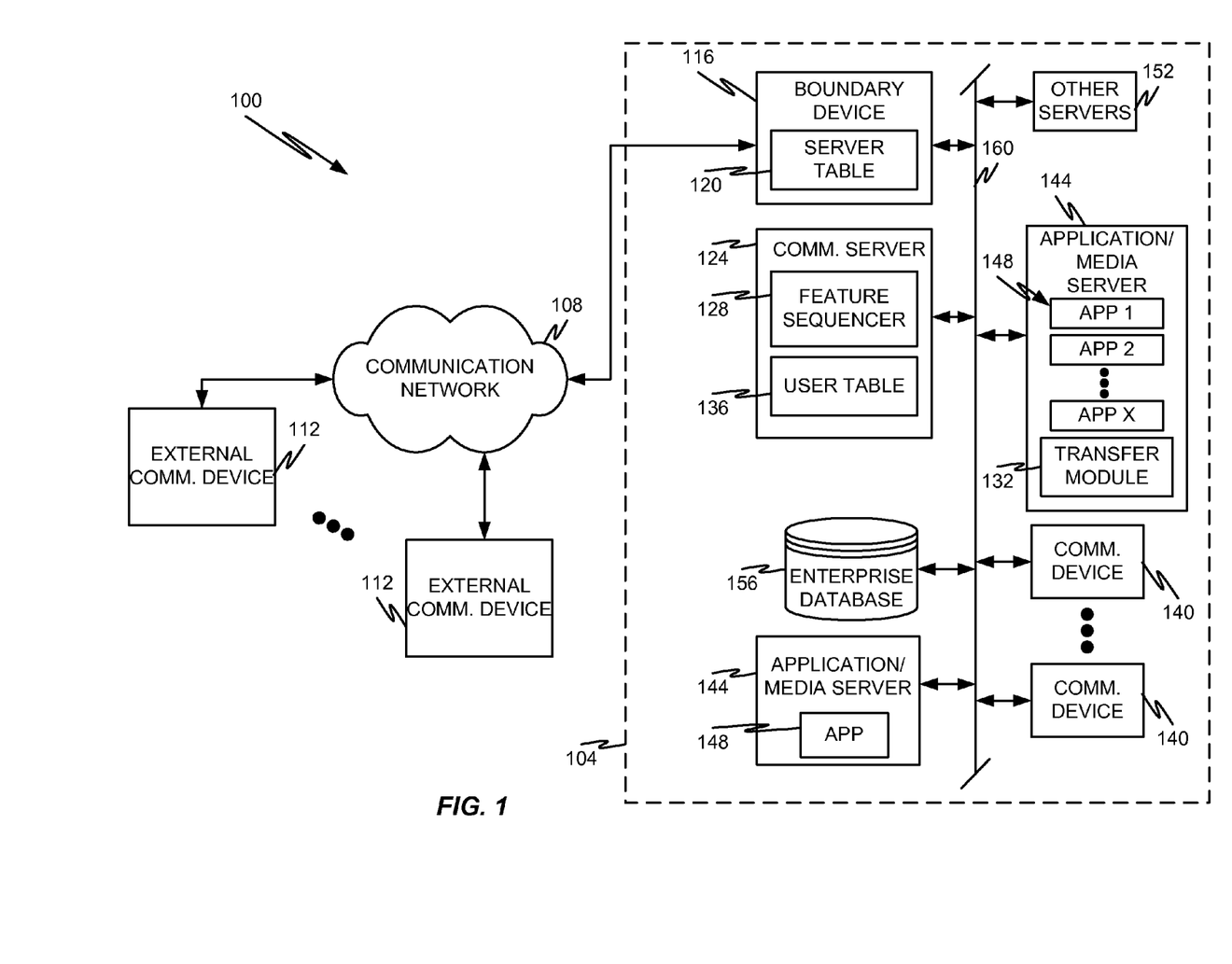
FIG. 1 is a block diagram of a communication system in accordance with embodiments of the present disclosure.

With reference initially to FIG. 1, a communication system 100 will be described in accordance with embodiments of the present disclosure. The communication system 100 is depicted as including an enterprise network 104 that is connected to one or more external communication devices 112 via a communication network 108. Components of the enterprise network 104 are depicted as including a network boundary device 116, a communication server 124, a plurality of communication devices 140, one or more application/media servers 144, other servers 152, and an enterprise database 156. It should be appreciated that one or more of the components depicted as being within the enterprise network 104 may alternatively or additionally be provided outside the enterprise network 104.

In some embodiments, the communication network 108 may correspond to any type of known communication network. Examples of a suitable communication network 108 include, without limitation, the Internet, the Public Switched Telephone Network (PSTN), a cellular network, an IMS network, an ISDN network, any other packet-switched network, any other circuit-switched network, or combinations thereof. In one configuration, the communication network 108 is a public network supporting the TCP/IP suite of protocols.

The external communication devices 112 are generally referred to as "external" because they are either not under the direct control of the enterprise administering the enterprise network 104 or have a decreased level of trust with the enterprise network 104 as compared with communication devices 140 that are within the enterprise network 104. Exemplary types of external communication devices 112 include, without limitation, cellular phones, laptops, tablets, Personal Computers (PCs), Personal Digital Assistants (PDAs), digital phones, analog phones, and the like.

The communication devices 140 within the enterprise network 104, similar to the external communication devices 112, may correspond to user communication devices and, in some embodiments, may correspond to a UA or multiple UAs of enterprise users. Examples of communication devices 140 include, without limitation, a telephone, a softphone, a cellular phone, a multi-speaker communication device (e.g., conference phone), a video phone, a PC, a laptop, a tablet, a PDA, a smartphone, a thin client, or the like. It should be appreciated that a communication device 140 may be configured to support single or multi-user interactions with other communication devices 140 within the enterprise network 104 as well as other communication devices 112 that are external to the enterprise network 104.

The communication devices 112, 140 may include any collection of components (hardware and software) that enable users to exchange media (e.g., voice, video, etc.), data (e.g., emails, Short Message Service (SMS) messages, Multimedia Message Service (MMS) messages, files, presentations, documents, etc.) with one another's communication devices over the communication network 108 and/or within the enterprise network 104.

The enterprise network 104 may correspond to either a single-location enterprise network or a multi-location enterprise network. A single-location enterprise network may comprise a network backbone 160 that corresponds to a Local Area Network (LAN) that includes wired (e.g., Ethernet) and/or wireless (e.g., Wi-Fi) technologies. A multi-location enterprise network may comprise a network backbone 160 that is a Wide Area Network (WAN), which connects a plurality of LANs or similar network locations via one or more untrusted networks, such as the communication network 108.

In some embodiments, the network boundary device 116 is provided to separate the external communication devices 112 and the untrusted communication network 108 from the network backbone 160 and components contained within the enterprise network 104. As an example, the network boundary device 116 operates to secure the enterprise network 104 from malicious attacks from the communication network 108. Examples of a network boundary device 116 include, without limitation, a Session Border Controller (SBC), a gateway, a Network Address Translation (NAT) device, a firewall, a router, or any other collection of hardware and/or software that performs one or more functions such as filtering, protocol translation/mapping, impedance matching, rate conversion, fault isolation, signal translation, encryption, packet tunneling, etc. as necessary to provide interoperability and/or security for the enterprise network 104.

As shown in FIG. 1, the boundary device 116 includes a server table 120. The server table 120 may correspond to any data structure or collection of data structures that enables the boundary device 116 to appropriately route messages from the external communication devices 112 to one or more communication servers 124 of the enterprise network 104. Specifically, while the enterprise network 104 is only depicted as having a single communication server 124, it should be appreciated that some enterprise networks 104 may comprise a plurality of communication servers 124 and each of those servers may be authoritative for (e.g., provide services for) a subset of enterprise users. In such a scenario, messages received at the boundary device 116 will be routed to the appropriate communication server 124 by referring to entries in the server table 120 that may define which communication server 124 is authoritative for an enterprise user that is a target of the received message.

In some embodiments, the communication server 124 may be used to help establish communication sessions and/or move signaling paths, change call topology, etc. Specifically, the communication server 124 may include a Private Branch eXchange (PBX), an enterprise switch, an enterprise server, combinations thereof, or any other type of telecommunications system switch or server. The communications server 124 is, in some embodiments, configured to execute telecommunication functions such as the suite of Avaya Aura™ applications of Avaya, Inc., including Communication Manager™, Avaya Aura Communication Manager™, Avaya IP Office™, Communication Manager Branch™, Session Manager™, System Manager™, Multi-Vantage Express™, and combinations thereof.

As noted above, although only a single communications server 124 is depicted in FIG. 1, two or more communications servers 124 may be provided in a single enterprise network 104 or across multiple separate LANs 160 owned and operated by a single enterprise, but separated by the untrusted communication network 108. In configurations where an enterprise or an enterprise network 104 includes two or more communications servers 124, each server 112 may comprise similar functionality, but may be provisioned for providing its features to only a subset of all enterprise users. In particular, a first communications server 124 may be authoritative for and service a first subset of enterprise users whereas a second communications server 124 may be authoritative for and service a second subset of enterprise users, where the first and second subsets of users generally do not share a common user.

Additionally, multiple servers 124 can support a common user community. For example, in geo-redundant and other applications where users aren't necessarily bound to a single application server, there may be a cluster of equivalent servers where a user can be serviced by any server in the cluster.

A communications server 124 can be configured to include user communication preferences in a user table 136, which map, for a corresponding (enterprise subscriber) user, to a set of communication preferences to be invoked for an incoming and/or outgoing contact for each user for whom it is authoritative. Even more specifically, communications between internal enterprise users (e.g., internal communication devices 140) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but this is not necessarily required. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by an untrusted communication network 108. When an external communication device 112 is involved in at least one of a call and/or transfer, then yet another communication server 124 may invoked to sequence applications, as needed.

In accordance with at least some embodiments of the present disclosure, the communication sever 124 may include a feature sequencer 128 that is configured to instantiate the communication preferences for a calling and/or called user, regardless of whether or not the calling and/or called user are using an external communication device 112 or internal communication device 140. In some embodiments, the user communication preferences in the user table 136 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session. As can be appreciated, the application sequence can be set-up for new communication sessions or during a transfer event.

In accordance with at least some embodiments, the communication server 124 can determine an application sequence and cause one or more applications 148 to be sequenced into a communication session. In particular, the communication server 124 is configured to analyze a particular user's communication preferences as defined in the user table 136 and invoke the necessary applications 148 to fulfill such preferences. Once an application sequence is determined for a calling and/or called user, the communications server 124 passes the communication-establishing message (e.g., an INVITE message) to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the communication server 124 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, this process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide a single application or a set of applications 148. The applications provided by a particular application server 144 may vary depending upon the capabilities of the server 144 and in the event that a particular application server 144 comprises a set of applications 148, one, some, or all of the applications in that set of applications 148 may be included in a particular application sequence. There is no requirement, however, that all applications in a set of applications 148 be included in an application sequence and there is no requirement as to the order in which applications are included in the application sequence. Rather, the application sequence is usually determined based on a user's communication preferences, which can be found in the user communication preferences table 136. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences related to transfer events. For instance, it may be possible for a user to define what types of applications should be sequenced if that user is a transferor, a transferee, and/or a transfer target, and the application sequence may vary depending upon the role of the user in the transfer event.

The applications included in a particular application sequence are generally included to accommodate the user's preferences. Applications may vary according to mediatype, function, and the like. Exemplary types of applications include, without limitation, an EC-500 (extension to cellular) application, a call-setup application, a call-recording application, a dynamic device pairing application, a voice-mail application, an email application, a voice application, a video application, a text application, a conferencing application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

In some embodiments, when the communication server 124 includes one or more applications 148 in a communication session, those applications may be configured to behave as a B2BUA. When an application, or any other communication element, behaves as a B2BUA, the application inserts itself in the control signaling path so that it can maintain complete call state and participate in all call requests.

A more specific example of an application that may reside on an application server 144 is a transfer module 132. In some embodiments, the communication server 124 may not actually know the transfer module 132 to be different than any other sequenced application, such as one or more of applications 148. The transfer module 132, in operation, may facilitate an attended and/or semi-attended transfer between users within the enterprise network 104, in a different enterprise network, and/or at an external communication device 112. The transfer module 132 may comprise the functionality necessary to enable a semi-attended transfer between users operating different endpoints and/or being connected to networks having different transfer behavior definitions. Further still, the transfer module 132 may be configured to alter or decorate one or more extensions on a SIP message depending upon the type of transfer event that is occurring and the state of the transfer event. Specifically, the transfer module 132 may be configured to: (1) include and/or alter an extension to the Replaces header to deal with forking environments by specifying a value or analyzing a value for an "av-match" parameter of a message and/or (2) include and/or alter an extension to the Reason header to notify downstream SIP application(s) about the transfer operating during dialog re-purposing.

It should be appreciated that the transfer module 132 may reside, completely or partially, in the communication server 124, an application/media server 144, or any other device depicted in any of the figures. In some embodiments, the transfer module 132 may be implemented by a server or device that places itself in a communication session as a B2BUA as a sequenced application.

The other servers 152 may include any other type of server or switch needed for operating the enterprise network 104. Examples of suitable other servers 152 include, without limitation, presence servers, Instant Messaging (IM) servers, email servers, voicemail servers, virtual machines, web servers, call center servers, Interactive Voice Response (IVR) units, etc.

The enterprise database 156 may include information regarding enterprise users and/or non-enterprise users. Specifically, the enterprise database 156 may comprise information that identifies enterprise users, their relative position within the enterprise hierarchy, network permissions, communication permissions, Customer Relationship Management (CRM) information, etc. The enterprise database 156 may be any type of data storage system and may include one or more hierarchical databases, relational databases, or any other type of known database structure such as a SQL database. The enterprise database 156, although depicted as being separate from the user communication preferences 136 in the communication server 124, may comprise the data regarding user communication preferences 136 and may be accessible to the communication server 124 via a database lookup or query/response protocol.

It should be appreciated that some or all of the functions depicted in FIG. 1 may be co-hosted and/or co-resident on a single server. The depiction of components in FIG. 1 is generally intended to be a logical depiction of the components of the system 100.

Figure 2A:
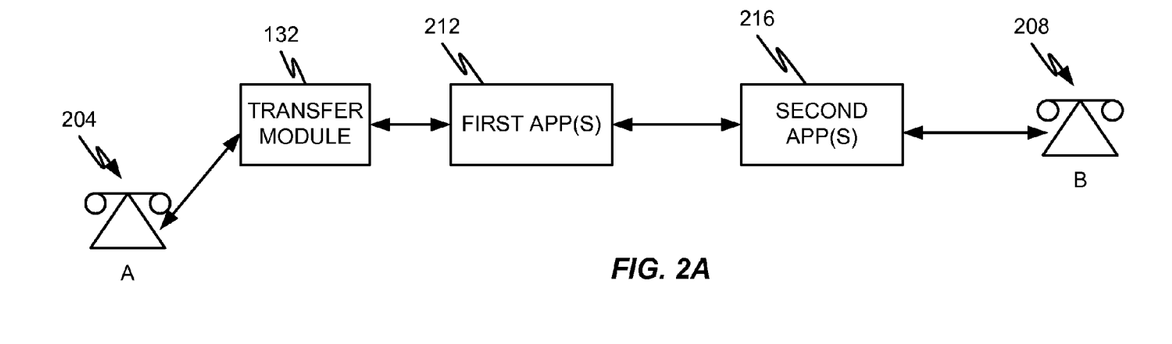
FIG. 2A is a block diagram of first call topology in accordance with embodiments of the present disclosure.

With reference now to FIGS. 2A-2D, additional features of the transfer module 132 and its ability to facilitate a semi-attended transfer will be described in accordance with at least some embodiments of the present disclosure. Specifically, FIG. 2A depicts a first call topology where a first user (e.g., User A) is involved in a communication session (e.g., first communication session) with a second user (e.g., User B). Although not depicted, other users may be involved in the first communication session and may be conferenced into the first communication session via a mixer at User A's endpoint 204, via a mixer at User B's endpoint 208, or via a centralized conference bridge. In some embodiments, User A may have one or more applications (e.g., first application(s) 212) sequenced into the first communication session in accordance with defined preferences in the user table 136 for User A. As shown in FIG. 2A, one of the applications sequenced for User A may correspond to a transfer module 132. Likewise, User B may have one or more applications (e.g., second application(s) 216) sequenced into the first communication session in accordance with defined preferences in the user table 136 for User B.

The application(s) 212, 216 may correspond to one or more applications 148 within an enterprise network 104 or they may correspond to applications external to the enterprise network 104. Alternatively or additionally, the communication server 124 may be sequenced into the first communication session. In some embodiments, the application(s) 212, 216 may be sequenced into the first communication session and behave as B2BUAs, proxies, or the like.

At some point during the first communication session, the determination may be made to have User A transfer User B to another user (e.g., User C). When this determination is made, User A (the transferor) may initiate a transfer process by dialing out to User C. This may occur with or without User B being put on hold by User A. When User A dials User C, another set of applications (e.g., third application(s) 224) may be sequenced on behalf of User A. These applications may be the same or different from the first application(s) 212 and they may also include the communication server 124 that is authoritative for User A.

Figure 2B:
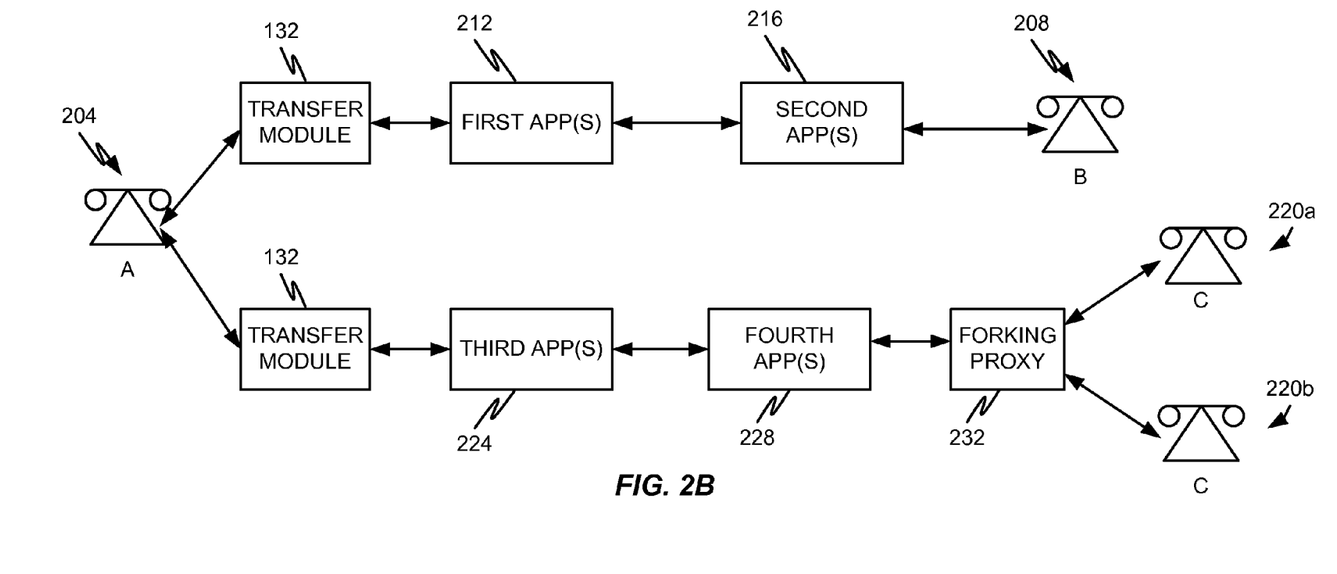
FIG. 2B is a block diagram of a second call topology in accordance with embodiments of the present disclosure.
Figure 2C:
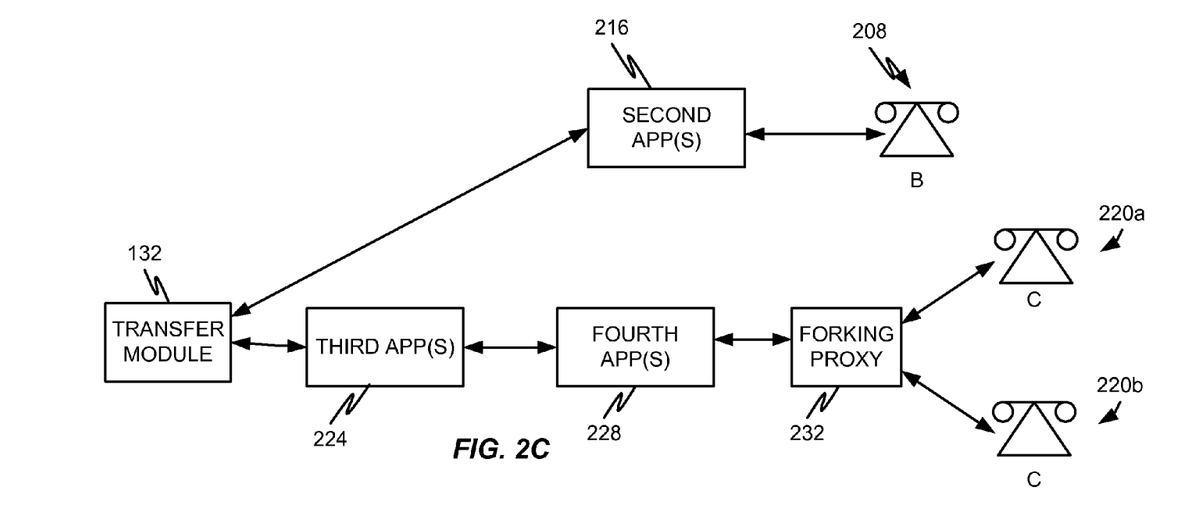
FIG. 2C is a block diagram of a third call topology in accordance with embodiments of the present disclosure.

Once all application(s) 224 have been sequenced for User A, possibly including another transfer module 132, one or more applications (e.g., fourth application(s) 228) may be sequenced for User C. These applications may include one or more applications 148 and/or a communication server 124 that is authoritative for User C. As seen in FIG. 2B, a forking proxy 232 may also be invoked in accordance with communication preferences of User C. The forking proxy 232 may be configured to cause two or more endpoints 220a, 220b to be sequentially or simultaneously alerted for User C. As an example, User C may have a desk phone (e.g., first endpoint 220a) and a mobile device (e.g., second endpoint 220b). User C's communication preferences may dictate that both of these devices are to be alerted when a call is directed toward User C. When one or both of the endpoints 220a, 220b begin alerting, ringback may be sent to User A to indicate that the devices 220a, 220b are ringing. During ringback (or any other feedback media), User A may elect to take User B off hold. Also during ringback, User A may decide to complete the transfer and let User B wait for User C to answer one of the endpoints 220a, 220b. If User A completes the transfer at the first endpoint 204 (e.g., by pressing a transfer or "transfer on hangup" button), before User C answers (e.g., before either endpoint 220a, 220b goes off hook), the transfer scenario is considered a semi-attended transfer and a call topology such as shown in FIG. 2C is created until User C answers and the transfer module 132 cleans up the call topology to arrive at the topology depicted in FIG. 2D.

As will be discussed in connection with FIGS. 3 and 4, a number of different message sequences may be followed during this semi-attended transfer depending upon whether User A is using a first endpoint 204 that is intelligent or simple. An intelligent first endpoint 204 may be configured to transition between the topologies of FIGS. 2B, 2C, and 2D by clearing its dialogs to User B (the second endpoint 208) and User C (the third endpoint 220a, 220b) as quickly as possible. Specifically, the first endpoint 204, if intelligent, may knowingly participate in the semi-attended transfer flow. On the other hand, a simple first endpoint 204 may not know to clear the dialogs to User B and User C. Instead, the simple first endpoint 204 may wait to clear its dialogs until it sees an appropriate BYE message from the third endpoint that was used to answer the transfer call.

Figure 2D:
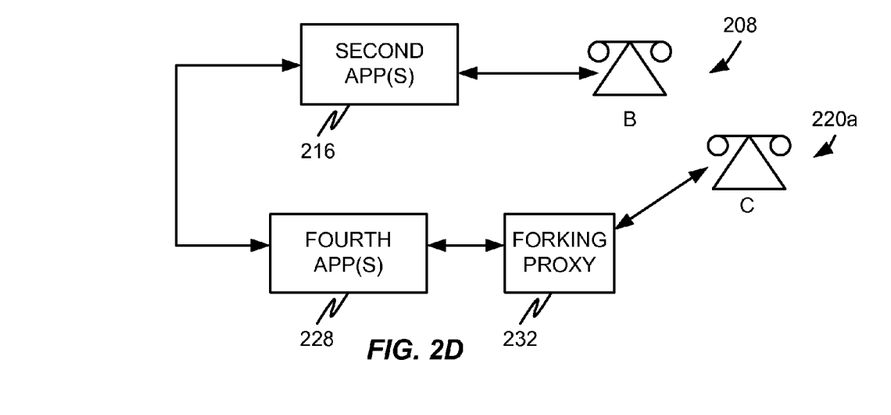
FIG. 2D is a block diagram of a fourth call topology in accordance with embodiments of the present disclosure

FIG. 2D depicts the call topology after the first endpoint 204 has removed itself from the call and the transfer has completed. The depicted embodiment shows that User C answered the transfer call at the endpoint 220a, but it should be appreciated that User C could have answered the transfer call at endpoint 220b. Another aspect of the final call topology is that the first and third application(s) 212, 224 have been removed from the dialog between User B and User C. Illustrative message exchanges that achieve the above-noted features will now be described in connection with FIGS. 3 and 4.

Figure 3:
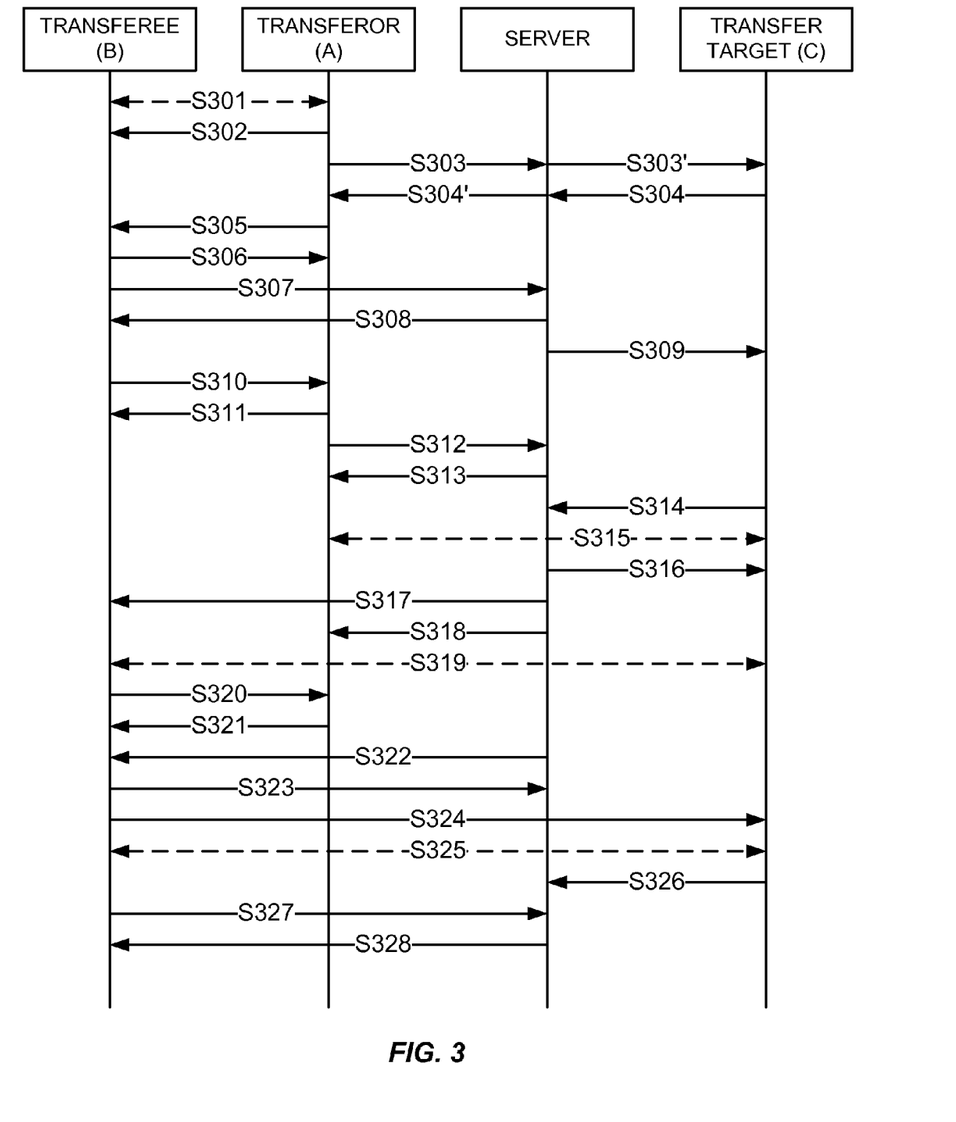
FIG. 3 is a communications diagram depicting a first message flow in accordance with embodiments of the present disclosure.

Referring initially to FIG. 3, message flows for a semi-attended transfer whereby User C (or a server for User C) does not provide early media back to the calling user(s) (e.g., User A and/or User B) will be described in accordance with at least some embodiments of the present disclosure. The diagram of FIG. 3 shows User B as the transferee, User A as the transferor, and User C as the transfer target. FIG. 3 also shows that the transfer is enabled by a server, such as a communication server 124 implementing the transfer module 132. It should be appreciated that any server or combination of servers comprising functionality of the transfer module 132 may collectively act to provide the features described for the single server of FIG. 3. In some embodiments, the server shown in FIG. 3 may correspond to a communication server 124 that is authoritative for the transferor (e.g., User A) and the various transfer functions may be executed by the transfer module 132 of that communication server 124.

Initially, in step S301, a first communication session is established between User A and User B. Specifically, the first communication session may comprise a topology similar to that depicted in FIG. 2A and the first communication session may comprise a media pathway established with Real-time Transport Protocol (RTP), a Secure RTP (SRTP), or the like. In some embodiments, the first communication session may be established between User A and User B with an INVITE/ 200 OK/ACK exchange resulting in RTP between User A and User B.

At some point during the first communication session, the decision is made to transfer User B to User C. Specifically, in step S302, User A initiates a transfer by sending a hold instruction to User B (e.g., via an INVITE). Although not shown, when User B's endpoint receives the INVITE (hold), User B's endpoint may respond with a 200 OK, to which User A's endpoint responds with an ACK message. This initial INVITE message is transmitted in response to User A pressing a transfer key (or similar soft key) on his/her endpoint.

Following this exchange (e.g., once User B is placed on hold), User A transmits an INVITE message to User C (steps S303 and S303'). This INVITE message may transverse a server comprising the transfer module 132, which may correspond to User A's communication server 124, User B's communication server 124, or some other dedicated server.

In response to receiving the INVITE message, User C's endpoint(s) or forking proxy 232 may respond with a 180 Ringing (step S304 and S304'). Upon receiving the 180 Ringing message, User A's endpoint may play ringback for User A to indicate that User C's endpoint(s) are being alerted.

User A's endpoint then transmits a REFER with Replaces message to User B's endpoint (step S305), to which User B's endpoint responds with a NOTIFY (100 Trying message) (step S306). The transmission of the REFER with Replaces message is initiated in response to User A pressing the transfer key (or similar soft key) a second time, thereby completing the transfer with respect to User A's involvement. Since User A completed the transfer prior to User C answering the call, the transfer scenario is considered a semi-attended transfer. Although not depicted, User A's endpoint may respond to receiving the NOTIFY message from User B's endpoint with a 200 OK message. In some embodiments, the REFER with Replaces message transmitted to User B's endpoint provides at least some session or dialog description information (e.g., Session Description Protocol (SDP) information) related to User C's endpoint(s). In other words, the REFER with Replaces message provides information which allows User B's endpoint to replace User A's endpoint with User C's endpoint. The call topology at this point may resemble the topology depicted in FIG. 2B.

Once User B's endpoint receives the REFER with Replaces message from User A's endpoint, and either before or after it responded with the NOTIFY (100 Trying) message, User B's endpoint transmits an INVITE with Replaces message to the server (e.g., User A's authoritative communication server 124) (step S307). When the server receives the INVITE with Replaces message, the server invokes the transfer module 132 due to the fact that the dialog to be replaced (e.g., the dialog between User A's endpoint and User C's endpoint(s)) is not answered. In other words, the server invokes the transfer module 132 in response to receiving an INVITE with Replaces message and in response to determining that the dialog to be replaced has not been answered.

The server, with the assistance of the transfer module 132, responds to User B's endpoint with a 180 Ringing message (step S308). The 180 Ringing message causes User B's endpoint to provide ringback to User B, thereby enabling User B to know that User C's endpoint(s) are being alerted. The server also transmits an UPDATE message to User C's endpoint(s) (step S309). This UPDATE message may be transmitted before or after the 180 Ringing message. In some embodiments, the UPDATE message transmitted in step S308 provides a reason for the updated dialog (e.g., the replacement of User A with User B) and the display on User C's endpoint(s) is updated accordingly.

User B's endpoint responds to the 180 Ringing message by transmitting notification message to User A's endpoint (step S310). In some embodiments, this notification message may correspond to a NOTIFY (180 Ringing) message. If User A's endpoint is an intelligent endpoint (e.g., a fully-functional SIP device), then User A's endpoint will respond to the NOTIFY message, determine that the transfer is a semi-attended transfer, and immediately clear the dialogs to User B's endpoint and User C's endpoint(s). Specifically, User A's endpoint will transmit a BYE message to User B's endpoint, thereby clearing that dialog (step S311). User A's intelligent endpoint will also transmit a CANCEL message toward User C's endpoint(s) (step S312), but the CANCEL message is transmitted through the server (e.g., User A's authoritative communication server 124). The server responds to the CANCEL message with a 487 Request Terminated message (step S313). This results in the dialogs being cleared for User A's intelligent endpoint.

If User A's endpoint is not intelligent (e.g., is simple), then a different set of message flows may be followed because User A's endpoint will not be able to clear the dialogs as quickly as the intelligent endpoint. This scenario will be discussed in connection with messages transmitted in steps S318 and S321.

The message flow continues when User C finally answers the call at one of his/her endpoints. This event causes User C's endpoint (e.g., the one at which the call was answered) to transmit a 200 OK message back to the server (e.g., User A's authoritative communication server 124) (step S314). This causes a media channel (e.g., RTP, SRTP, etc.) to be established between User A's endpoint and User C's endpoint, assuming that User A's endpoint is a simple endpoint rather than an intelligent endpoint (step S315). Specifically, if User A's endpoint was intelligent, then User A's leg of the dialog with User C's endpoint(s) was already cleared in step S312. If User A's endpoint was not intelligent, then there would not be a transmission of the CANCEL message in step S312 or a 487 Request Terminated message in step S313

Thus, if User A's endpoint is simple, then the server will need to quickly correct the media flow by terminating the consultation call between User A's simple endpoint and User C's endpoint (e.g., because User A has already hung up and User B is waiting to speak to User C).

Thereafter, regardless of whether or not User A's endpoint is simple or intelligent, the server will transmit a re-INVITE message to User C's endpoint (step S316) to begin the process of correcting the media flow that was already established in step S315. User C's endpoint may respond with a 200 OK message, to which the server can respond with an ACK message. It should also be noted that if "strict" matching was requested, but the 200 OK is received from an endpoint other than the one requested in step S305, then alternative operations may be followed. In particular, if "strict" matching was requested in the Replaces header of the REFER message, then the transfer will be successfully completed if and only if the specified early dialog ends up answered on the specific endpoint that was strictly requested in step S305 (e.g., either endpoint 220*a* OR endpoint 220*b*). Failure to satisfy this condition will result in transfer not being completed.

The server then transmits a 200 OK message to User B's endpoint (step S317) and User B's endpoint may respond in a traditional way with an ACK message. The server also transmits a 408 Request Timeout message to User A's endpoint (step S318). This completes clearing of the dialog that User A's endpoint has initiated toward User C, when User A's endpoint is a simple endpoint. User B's endpoint then transmits a NOTIFY (200 OK) message to User A's simple endpoint (step S320). User A's simple endpoint then responds with a BYE message (step S321). This ultimately causes the original call between User B and User A to be terminated.

At this point, an initial media channel is established between User B's endpoint and User C's endpoint (step S319), but this initial dialog still has some aspects of User A's application(s) in the control path (e.g., the final dialog between User B and User C is not completely established to the exclusion of User A, User A's sequenced application(s), and/or User A's authoritative communication server 124). Accordingly, the server will wait for a few seconds into the call between User B and User C (e.g., more than one second after the media channel has been established in step S319) to create the final proper call topology. After the server has waited the appropriate amount of time, the server transmits a REFER with replaces message to User B's endpoint (step S322). This message comprises information that enables User B's endpoint to remove User A's applications and/or authoritative server from the signaling path for the final dialog.

User B's endpoint responds with a NOTIFY (100 Trying) message (step S323) that is transmitted to the server as well as an INVITE with Replaces message (step S324) that is transmitted to User C's endpoint. User C's endpoint may respond to the INVITE with replaces with a 200 OK message and User B's endpoint may respond thereto with an ACK message in the normal fashion. This exchange of INVITE with Replaces, 200 OK, and ACK results in the re-establishment of a media channel between User B's endpoint and User C's endpoint (step S324), except now the media and control signaling passes between User B and User C without traversing any of User A's applications and/or authoritative communication server 124.

The final exchanges needed to remove User A's authoritative server from the call flow is a transmission of a BYE message from User C's endpoint to the server (step S326), a transmission of a NOTIFY (200 OK) message from User B's endpoint to the server (Step S327), and a response from the server back to User B's endpoint with a BYE message (step S328). At this point, the call topology may resemble the topology depicted in FIG. 2C where the first and third applications 212, 224 have been removed from the media and signaling paths and only User B and User C have their sequenced applications and/or authoritative communication servers 124 in the media and/or call control signaling paths.

Figure 4:
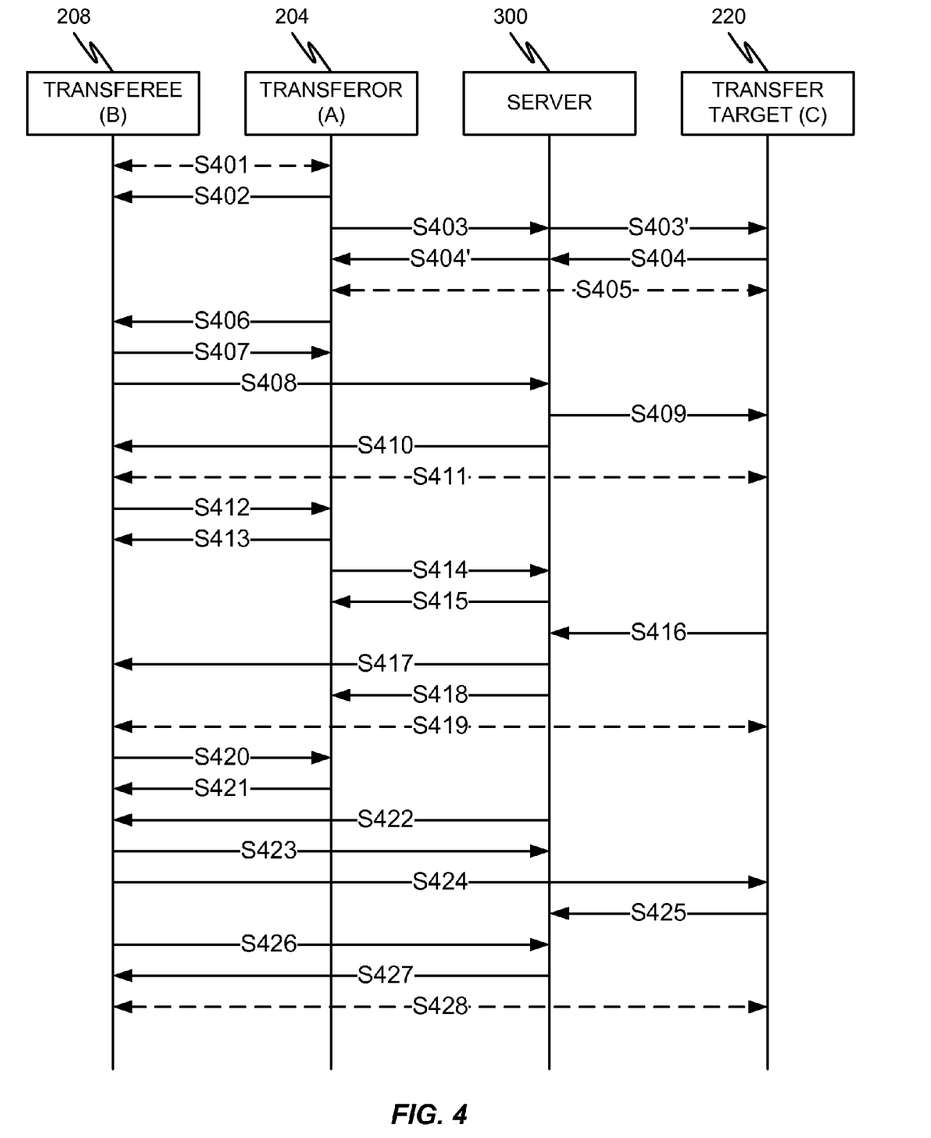
FIG. 4 is a communications diagram depicting a second message flow in accordance with embodiments of the present disclosure.

With reference now to FIG. 4, message flows for a semi-attended transfer whereby User C (or a server for User C) does provide early media back to the calling user(s) (e.g., User A and/or User B) will be described in accordance with at least some embodiments of the present disclosure. The diagram of FIG. 4 shows User B as the transferee, User A as the transferor, and User C as the transfer target. FIG. 4 also shows that the transfer is enabled by a server, such as a communication server 124 implementing the transfer module 132. It should be appreciated that any server or combination of servers comprising functionality of the transfer module 132 may collectively act to provide the features described for the single server of FIG. 4. In some embodiments, the server shown in FIG. 4 may correspond to a communication server 124 that is authoritative for the transferor (e.g., User A) and the various transfer functions may be executed by the transfer module 132 of that communication server 124.

Initially, in step S401, a first communication session is established between User A and User B. Specifically, the first communication session may comprise a topology similar to that depicted in FIG. 2A and the first communication session may comprise a media pathway established with Real-time Transport Protocol (RTP), a Secure RTP (SRTP), or the like. In some embodiments, the first communication session may be established between User A and User B with an INVITE/200 OK/ACK exchange resulting in RTP between User A and User B.

At some point during the first communication session, the decision is made to transfer User B to User C. Specifically, in step S402, User A initiates a transfer by sending a hold instruction to User B (e.g., via an INVITE). Although not shown, when User B's endpoint receives the INVITE (hold), User B's endpoint may respond with a 200 OK, to which User A's endpoint responds with an ACK message. This initial INVITE message is transmitted in response to User A pressing a transfer key (or similar soft key) on his/her endpoint.

Following this exchange (e.g., once User B is placed on hold), User A's endpoint transmits an INVITE message to User C's endpoint(s) (steps S403 and S403'). This INVITE message may transverse a server comprising the transfer module 132, which may correspond to User A's communication server 124, User B's communication server 124, or some other dedicated server.

In response to receiving the INVITE message, User C's endpoint(s) or a media server sequenced for User C may respond with a message to enable the transfer of media back to User A's endpoint (steps S404 and S404'). In some embodiments, the message transmitted back to User A's endpoint corresponds to a rel-183 Session Progress message. User A's endpoint may respond with a PRACK message, which may result in a media channel being established between User A's endpoint and User C's endpoint(s) as well as the playback of media for User A's endpoint (step S405). As is known in the telephony arts, the media provided to User A may be selected or provisioned by User C or an administrator of User C's endpoint(s).

After the media channel has been established, User A may press the transfer key or similar soft key a second time, thereby signifying User A's desire to complete the transfer process. User A is behaving as if User C has already answered the call, but User C has not yet answered the call, thereby creating a semi-attended transfer scenario. User A's actions cause User A's endpoint to transmit a REFER with Replaces message to User B's endpoint (step S406), to which User B's endpoint responds with a NOTIFY (100 Trying message) (step S407). Although not depicted, User A's endpoint may respond to receiving the NOTIFY message from User B's endpoint with a 200 OK message. In some embodiments, the REFER with Replaces message transmitted to User B's endpoint provides at least some session or dialog description information (e.g., SDP information) related to User C's endpoint(s). The call topology at this point may resemble the topology depicted in FIG. 2B.

Once User B's endpoint receives the REFER with Replaces message from User A's endpoint, and either before or after it responded with the NOTIFY (100 Trying) message, User B's endpoint transmits an INVITE with Replaces message to the server (e.g., User A's authoritative communication server 124) (step S408). When the server receives the INVITE with Replaces message, the server invokes the transfer module 132 due to the fact that the dialog to be replaced (e.g., the dialog between User A's endpoint and User C's endpoint(s)) is not answered. In other words, the server invokes the transfer module 132 in response to receiving an INVITE with Replaces message and in response to determining that the dialog to be replaced has not been answered.

The server, with the assistance of the transfer module 132, responds to receiving the INVITE with Replaces message by transmitting an UPDATE with reasons message to User C's endpoint(s) (step S409). In some embodiments, the UPDATE message transmitted in step S308 provides a reason for the updated dialog (e.g., the replacement of User A with User B) and the display on User C's endpoint(s) is updated accordingly. Additionally, this UPDATE message may include a new SDP offer from User B. This cannot be done in the non-early media case because it is not possible to send a new SDP offer before having received an answer from the other side. It should also be noted that this cannot be done in the non-early media case if a 100rel is not used in the initial INVITE between User A and User C.

The server also transmits a 183 Session Progress message to User B's endpoint (step S410), thereby causing a media channel to be established between User B's endpoint and User C's endpoint (step S411). This allows the early media from User C's endpoint or a media server operating on behalf of User C to provide media back to User B. Thus, User B now hears the media that was originally provided to User A in step S405 before User A completed the transfer and hung up.

Thereafter, User B's endpoint responds with a NOTIFY (183) message that is transmitted back to User A's endpoint (step S412). If User A's endpoint is an intelligent endpoint (e.g., a fully-functional SIP device), then User A's endpoint will respond to the NOTIFY message, determine that the transfer is a semi-attended transfer, and immediately clear the dialogs to User B's endpoint and User C's endpoint(s). Specifically, User A's endpoint will transmit a BYE message to User B's endpoint, thereby clearing that dialog (step S413). User A's intelligent endpoint will also transmit a CANCEL message toward User C's endpoint(s) (step S414), but the CANCEL message is transmitted through the server (e.g., User A's authoritative communication server 124). The server responds to the CANCEL message with a 487 Request Terminated message (step S415). This results in the dialogs being cleared for User A's intelligent endpoint.

If User A's endpoint is not intelligent (e.g., is simple), then a different set of message flows may be followed because User A's endpoint will not be able to clear the dialogs as quickly as the intelligent endpoint. This scenario will be discussed in connection with messages transmitted in steps S418 and S421.

The flow continues when User C finally answers the call at one of his/her endpoints. This event causes User C's endpoint (e.g., the one at which the call was answered) to transmit a 200 OK message back to the server (e.g., User A's authoritative communication server 124) (step S416). At this point, the consultation call (e.g., between User A's endpoint and User C's endpoint) should be terminated if it has not already been terminated by an intelligent endpoint. The server also responds to the 200 OK message by transmitting a 200 OK message to User B's endpoint (step S417) and a 408 Request Timeout message to User A's endpoint (step S418). Furthermore, the media channel between User B and User C is now capable of carrying media between Users B and C (step S419).

Following the above exchange, if User A's endpoint is simple, then no BYE message was transmitted in step S413. Instead, User B's endpoint will transmit a NOTIFY (200 OK) message to User A's endpoint (step S420). This causes User A's endpoint to terminate the original call with User B's endpoint by transmitting a BYE message back to User B's endpoint (step S421).

At this point, an initial media channel is established between User B's endpoint and User C's endpoint (step S419), but this initial dialog still has some aspects of User A's application(s) in the control path (e.g., the final dialog between User B and User C is not completely established to the exclusion of User A's sequenced application(s) and/or User A's authoritative communication server 124). Accordingly, the server will wait for a few seconds into the call between User B and User C (e.g., more than one second after the media channel has been established in step S419) to create the final proper call topology. After the server has waited the appropriate amount of time, the server transmits a REFER with replaces message to User B's endpoint (step S422). This message comprises information that enables User B's endpoint to remove User A's applications and/or authoritative server from the signaling path for the final dialog.

User B's endpoint responds with a NOTIFY (100 Trying) message (step S423) that is transmitted to the server as well as an INVITE with Replaces message (step S424) that is transmitted to User C's endpoint. The final exchanges needed to remove User A's authoritative server from the call flow is a transmission of a BYE message from User C's endpoint to the server (step S425), a transmission of a NOTIFY (200 OK) message from User B's endpoint to the server (step S426), and a response from the server back to User B's endpoint with a BYE message (step S427). Finally, the media channel and call control signaling paths can be established (step S428) that exclude User A's endpoint and his/her sequenced applications. At this point, the call topology may resemble the topology depicted in FIG. 2C where the first and third applications 212, 224 have been removed from the media and signaling paths and only User B and User C have their sequenced applications and/or authoritative communication servers 124 in the media and/or call control signaling paths.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of facilitating a semi-attended transfer between a transferor, a transferee, and a transfer target, the method comprising:
    intercepting, by a processor, a first message transmitted from a transferee's endpoint to a transfer target's endpoint, the first message containing information to execute the transfer;
    determining, by a processor, that the transfer target's endpoint is ringing and that a dialog between a transferor's endpoint and the transfer target's endpoint has not been answered prior to intercepting the first message; and
    invoking, by a processor, a transfer module to facilitate at least one of early media and ringback to be provided to the transferee's endpoint while the transfer target's endpoint is ringing even though the transfer target has not answered a transfer call.

2. The method of claim 1, further comprising:
    holding the first message until a second message is received indicating that the transfer target has answered the transfer call at at least one of the transfer target's endpoint and another endpoint;
    receiving the second message indicating that the transfer target has answered the transfer call; and
    in response to determining that the transfer target has answered the transfer call, transmitting a third message to the transferor's endpoint, the third message containing information to stop usage of a dialog that includes at least one device associated with the transferor and transition to a new dialog that excludes the transferor and the at least one device associated with the transferor.

3. The method of claim 2, wherein the first message comprises an INVITE with Replaces message, the second message comprises a 200 OK message, and wherein the third message comprises a REFER with Replaces message.

4. The method of claim 3, wherein the REFER with Replaces message comprises a Request URI and a dialog ID to be replaced upon completion of the transfer.

5. The method of claim 3, wherein the transfer module enables ringback to be provided to the transferee's endpoint even though the transfer target has not answered a transfer call.

6. The method of claim 3, wherein the transfer module enables early media to be provided to the transferee's endpoint even though the transfer target has not answered a transfer call, wherein the transfer module enables the early media to be provided to the transferee's endpoint by transmitting at least one of a rel-183 Session Progress message and a 183 message to the transferee's endpoint, and wherein the transfer module further transmits an UPDATE message to the endpoint at which transfer target answered the call, the UPDATE message containing Session Description Protocol (SDP) information for the transferor's endpoint.

7. The method of claim 1, wherein at least one application is sequenced for the transferor in an initial communication session between the transferor and transferee, and wherein the at least one application is removed from a dialog between the transferee's endpoint and the transfer target's endpoint in response to the transfer module sending a REFER with Replaces message and in response to the transfer module receiving a subsequent INVITE with Replaces message that is transmitted from the transferor's endpoint to the transfer target's endpoint.

8. The method of claim 1, wherein an UPDATE message is transmitted to the transfer target's endpoint, the UPDATE message containing an updated display string and also containing a Reason header that notifies downstream applications about the transfer operation during dialog re-purposing, wherein the UPDATE message also contains information that enables the transfer target's endpoint to show the transferee as a new calling party.

9. The method of claim 1, wherein the transfer module is executed by a communication server that is authoritative for the transferor and wherein the communication server behaves as a Back-to-Back User Agent in a dialog between the transferor's endpoint and the transferee's endpoint.

10. The method of claim 1, wherein the transferor's endpoint is an intelligent endpoint, the method further comprising:

receiving a sipfrag notification at the transferor's intelligent endpoint prior to the transfer target answering the transfer call;

in response to receiving the sipfrag notification and prior to the transfer target answering the transfer call, transmitting a BYE message from the transferor's intelligent endpoint to the transferee's endpoint to terminate a dialog with the transferee's endpoint; and in response to receiving the sipfrag notification and prior to the transfer target answering the transfer call, transmitting a CANCEL message from the transferor's intelligent endpoint to the transfer target's endpoint to terminate a dialog with the transfer target's endpoint.

11. The method of claim 10, wherein the sipfrag notification comprises at least one of a NOTIFY (180 Ringing) and NOTIFY (183) message.

12. A non-transitory computer-readable medium comprising processor-executable instructions that are executable by a processor, the instructions, when executed, enabling a semi-attended transfer between a transferor, a transferee, and a transfer target, the instructions comprising:

instructions configured to intercept a first message transmitted from a transferee's endpoint to a transfer target's endpoint, the first message containing information to execute the transfer;

instructions configured to determine that a dialog between a transferor's endpoint and the transfer target's endpoint has not been answered prior to intercepting the first message; and instructions configured to invoke a transfer module to facilitate at least one of early media and ringback to be provided to the transferee's endpoint while the transfer target's endpoint is ringing even though the transfer target has not answered a transfer call.

13. The computer-readable medium of claim 12, the instructions further comprising:

instructions configured to hold the first message until a second message is received indicating that the transfer target has answered the transfer call at at least one of the transfer target's endpoint and another endpoint;

instructions configured to determine that the second message has been received, the second message indicating that the transfer target has answered the transfer call; and instructions configured to, in response to determining that the transfer target has answered the transfer call, transmit a third message to the transferor's endpoint, the third message containing information to stop usage of a dialog that includes at least one device associated with the transferor and transition to a new dialog that excludes the transferor and the at least one device associated with the transferor.

14. The computer-readable medium of 13, wherein the first message comprises an INVITE with Replaces message, the second message comprises a 200 OK message, and wherein the third message comprises a REFER with Replaces message.

15. The computer-readable medium of 14, wherein the REFER with Replaces message comprises a Request URI and a dialog ID to be replaced upon completion of the transfer.

16. The computer-readable medium of claim 12, wherein the transfer target comprises alerting preferences that cause a first endpoint and a second endpoint to be alerted for calls directed toward the transfer target, wherein the transferor's endpoint transmits at least one message that is intercepted by the transfer module, the at least one message intercepted by the transfer module comprising at least one parameter capable of having at least two values, a first of the at least two values specifying that the transfer call is to be completed successfully regardless of which early dialog ends up answered by the transfer target, a second of the at least two values specifying that the transfer call is to be completed successfully if and only if a specified early dialog is answered by the transfer target.

17. The computer-readable medium of claim 12, wherein at least one application is sequenced for the transferor in an initial communication session between the transferor and transferee, and wherein the at least one application is removed from a dialog between the transferee's endpoint and the transfer target's endpoint in response to the transfer module receiving a REFER with Replaces message and then a subsequent INVITE with Replaces message that is transmitted from the transferor's endpoint to the transfer target's endpoint.

18. The computer-readable medium of claim 12, wherein the transferor's endpoint is an intelligent endpoint, the instructions further comprising:

instructions configured to determine that a sipfrag notification has been received at the transferor's intelligent endpoint prior to the transfer target answering the transfer call;

instructions configured to, in response to receiving the sipfrag notification and prior to the transfer target answering the transfer call, cause a BYE message to be transmitted from the transferor's intelligent endpoint to the transferee's endpoint to terminate a dialog with the transferee's endpoint; and instructions configured to, in response to receiving the sipfrag notification and prior to the transfer target answering the transfer call, cause a CANCEL message to be transmitted from the transferor's intelligent endpoint to the transfer target's endpoint to terminate a dialog with the transfer target's endpoint.

19. A communication server, comprising:

a processor; and memory coupled to the processor and including a transfer module in the form of processor-executable instructions, the transfer module configured to intercept an INVITE with Replaces message transmitted from a transferee's endpoint to a transfer target's endpoint, the INVITE with Replaces message containing information to execute the transfer, determine that a dialog between a transferor's endpoint and the transfer target's endpoint has not been answered prior to intercepting the INVITE with Replaces message, and in response to determining that the dialog has not been answered, cause at least one of early media and ringback to be provided to the transferee's endpoint while the transfer target's endpoint is ringing even though the transfer target has not answered the transfer call.

20. The server of claim 19, wherein the transfer module is further configured to hold the INVITE with Replaces message until a 200 OK message is received indicating that the transfer target has answered the transfer call, determine that the 200 OK message has been received, the 200 OK message indicating that the transfer target has answered the transfer call, and in response thereto, transmit a REFER with Replaces message to the transferor's endpoint, the REFER with Replaces message containing information to stop usage of a dialog that includes at least one device associated with the transferor and transition to a new dialog that excludes the transferor and the at least one device associated with the transferor.

21. The server of claim 20, wherein the REFER with Replaces message comprises a Request URI and a dialog ID to be replaced upon completion of the transfer.

22. A method of facilitating a semi-attended transfer between a transferor, a transferee, and a transfer target, the method comprising:
- intercepting a first message transmitted from a transferee's endpoint to a transfer target's endpoint, the first message containing information to execute the transfer;
- determining that a dialog between a transferor's endpoint and the transfer target's endpoint has not been answered prior to intercepting the first message; and
- invoking a transfer module to facilitate at least one of early media and ringback to be provided to the transferee's endpoint even though the transfer target has not answered a transfer call;
- wherein the transfer target comprises alerting preferences that cause a first endpoint and a second endpoint to be alerted for calls directed toward the transfer target, and wherein the transferor's endpoint transmits at least one message that is intercepted by the transfer module, the at least one message intercepted by the transfer module comprising at least one parameter capable of having at least two values, a first of the at least two values specifying that the transfer call is to be completed successfully regardless of which early dialog ends up answered by the transfer target, a second of the at least two values specifying that the transfer call is to be completed successfully if and only if a specified early dialog is answered by the transfer target.

* * * * *

UNITED STATES PATENT AND TRADEMARK OFFICE
CERTIFICATE OF CORRECTION

PATENT NO. : 9,762,628 B2
APPLICATION NO. : 13/770551
DATED : September 12, 2017
INVENTOR(S) : Milos Pujic, Joel M. Ezell and Harsh V. Mendiratta Page 1 of 1

It is certified that error appears in the above-identified patent and that said Letters Patent is hereby corrected as shown below:

At Column 19, Line 60, please delete "a" and insert --the-- therein.

At Column 19, Line 65, please delete the first occurrence of "a" and insert --the-- therein.

Signed and Sealed this
Fourteenth Day of November, 2017

Joseph Matal
*Performing the Functions and Duties of the
Under Secretary of Commerce for Intellectual Property and
Director of the United States Patent and Trademark Office*